United States Patent
Watson et al.

(10) Patent No.: US 6,273,027 B1
(45) Date of Patent: Aug. 14, 2001

(54) AUTOMATIC TRAINING DEVICE AND METHOD

(76) Inventors: John S. Watson, 2575 Cedar St.; Ian Dunbar, 129 Tamalpais Rd., both of Berkeley, CA (US) 94708

(*) Notice: Subject to any disclaimer, the term of this patent is extended or adjusted under 35 U.S.C. 154(b) by 0 days.

(21) Appl. No.: 09/448,292

(22) Filed: Nov. 24, 1999

(51) Int. Cl.$^7$ .................................................. A01K 37/00
(52) U.S. Cl. ............................................................. 119/712
(58) Field of Search ............................. 119/51.02, 51.11, 119/51.13, 51.14, 56.1, 905

(56) References Cited

U.S. PATENT DOCUMENTS

| | | |
|---|---|---|
| 3,603,290 | 9/1971 | O'Rork . |
| 4,335,682 | 6/1982 | Gonda et al. . |
| 4,498,424 | 2/1985 | Leuschner . |
| 4,557,219 | 12/1985 | Edwards . |
| 4,756,277 * | 7/1988 | Peng ................................. 119/51.11 |
| 5,078,097 * | 1/1992 | Chisholm ........................ 119/51.13 |
| 5,133,292 * | 7/1992 | Kirk ................................ 119/51.04 |
| 5,343,828 | 9/1994 | Houghton et al. . |
| 5,501,868 | 3/1996 | Collings et al. . |
| 5,566,645 | 10/1996 | Cole . |
| 5,640,931 | 6/1997 | Markham . |
| 5,749,324 | 5/1998 | Moore . |
| 5,758,604 | 6/1998 | Jorgensen . |
| 5,809,939 | 9/1998 | Robart et al. . |
| 5,813,366 | 9/1998 | Mauldin, Jr. . |

* cited by examiner

*Primary Examiner*—Thomas Price
(74) *Attorney, Agent, or Firm*—Birch, Stewart, Kolasch & Birch, LLP

(57) ABSTRACT

There are provided a non-punitive, positive-reinforcement based automatically rewarding training device and a method for training an animal or patient to reduce exhibition of an undesired behavior in a caretaker's absence. The training device delivers rewards automatically at an interval of time, in response to a detected desired behavior and/or in response to a reduction or absence of a undesired behavior. The animal's general behavior is monitored with behavior detectors and one or more desired and/or undesired behaviors are targeted. An interval of time between the delivery of consecutive rewards may be modulated as a function of the targeted behaviors that are detected.

58 Claims, 7 Drawing Sheets

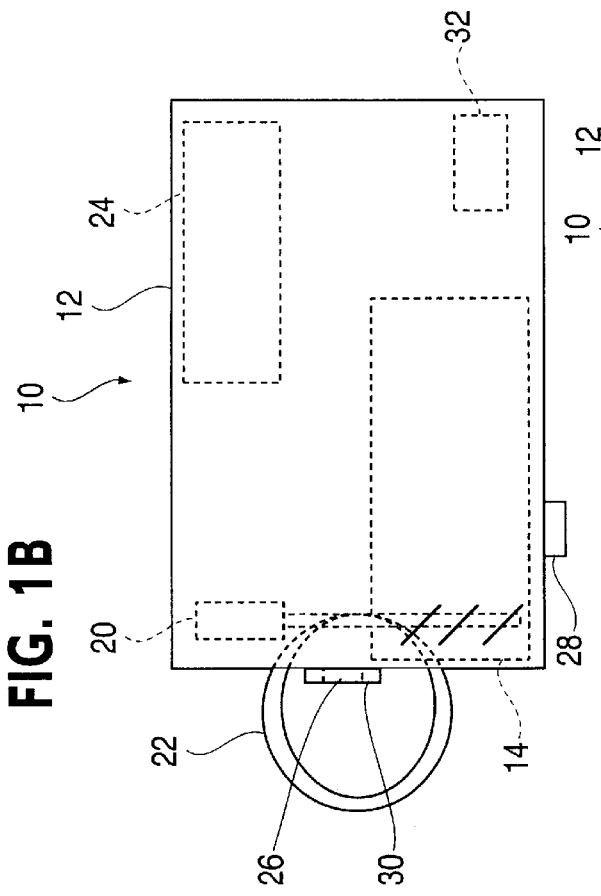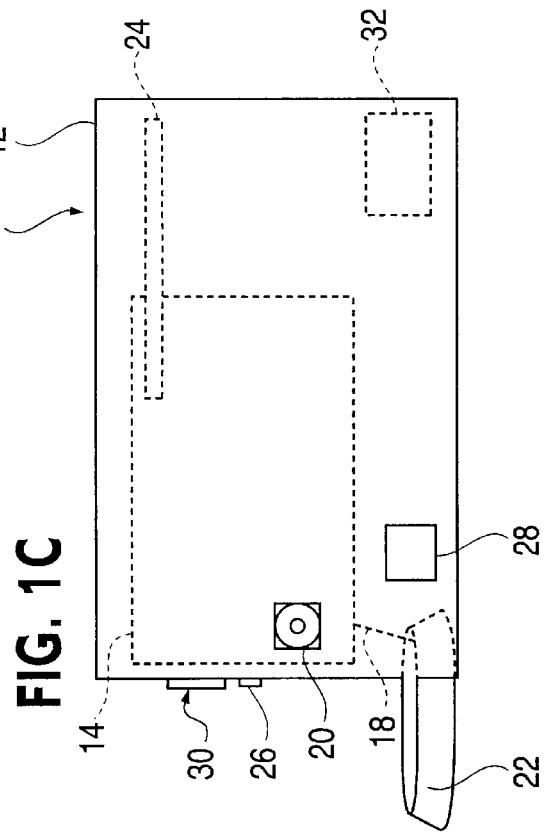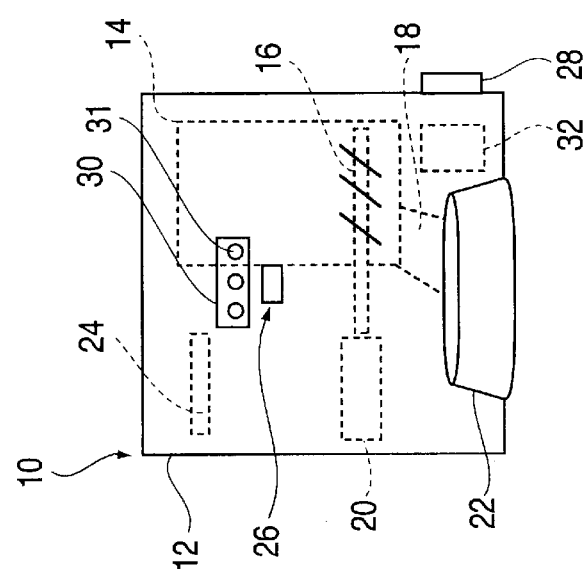

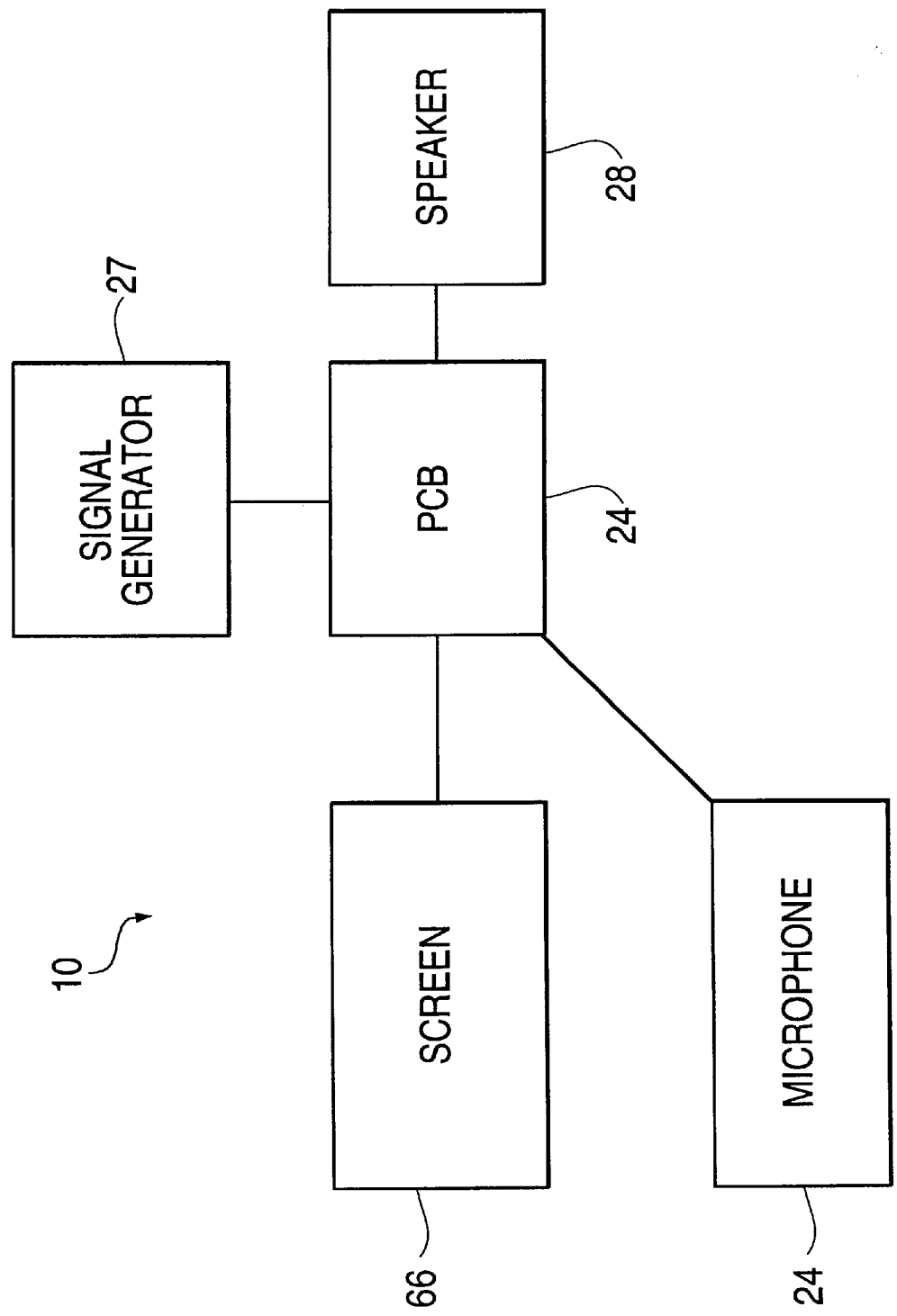

AUTOMATIC TRAINING DEVICE AND METHOD

BACKGROUND OF THE INVENTION (a) Field of the Invention

The present invention relates to training devices and methods, and more particularly to automatic non-punitive, positive reinforcement-based training device and method.

(b) Description of Prior Art

People have been domesticating and training animals for ten thousand years, whereby desired behaviors have been increased by reward or discontinuing punishment and undesired behavior reduced or eliminated by punishment or discontinuing reward. Throughout the twentieth century, punishment techniques have been by far the most common approach for decreasing undesired behaviors such as aggression, excessive vocalization and activity, intractability and inappropriate elimination. Surprisingly though, punishment and negative reinforcement (the discontinuance of punishment when the animal gives in and complies) techniques also have been the most common approach for "teaching" desired behaviors. Dogs have been taught to heel, sit and lie down by punishment with repetitive leash jerks using metal choke chains and spiked, pinch collars. Dogs have also been taught to retrieve objects through negative reinforcement by pinching their ears with pliers and other metal tools and releasing the pressure when they grasp the retrieval object.

A vast and scary array of "training tools" has been developed to give a trainer the mechanical advantage when administering punishment and negative reinforcement. Such tools include canes, clubs, whips, twitches, electric cattle prods, electronic shock collars and all sorts of metal collars, spurs, bits and restraints. Apart from being unpleasant, an over reliance on punishment in training has a significant side effect. Namely, the trainee quickly associates the aversive and unpleasant stimuli with the trainer and so learns that there are times when it needs not comply, for example when at liberty and out of reach, or when the trainer is absent. Consequently, numerous products have been developed to allow the trainer to punish animal at a distance, or for automated punishment of the animal in the owner's absence. However, prior training of the animal and/or the trainer is necessary for these products to work effectively and to ensure that the products are used safely and humanely.

For example, U.S. Pat. No. 4,335,682 issued to Gonda et al. on Jun. 22, 1982 describes a collar activated with a remote control and that emits electrical shocks followed by sounds. U.S. Pat. No. 5,749,324 issued to Moore on May 12, 1998 describes a collar producing high-frequency sound bursts upon barking of the dog and is also activated with a remote control.

Such devices ignore the performing of desired behaviors by the animal. Moreover, the animal is frightened by the stimulus, which increases its stress level, affects its learning and general well-being, and causes exhibition of other negative behaviors such as avoidance and aggressiveness.

Devices combining punishment and positive reinforcement are also in use. For example, U.S. Pat. No. 5,809,939 issued to Robart et al. on Sep. 22, 1998 and U.S. Pat. No. 5,566,645 issued to Cole on Oct. 22, 1996 describe bridle bits which also dispense pleasant fluids in the horse's mouth. However, the combination of punishment and positive reinforcement confuses the animal. Moreover, the bridle bit is usable only with bitable animals.

Other electronic collars use recordings of the trainer's praise, shouts and instructions to encourage quietness and discourage barking. There are two major problems with such collars. First, considerable pretraining is necessary for the dog to understand the meaning of the trainer's recorded instructions. Second, without the trainer's presence to continually back up recorded praise, shouts and instructions with rewards and punishments, the effectiveness of the device decreases in the trainer's absence.

U.S. Pat. No. 5,351,653 issued to Marishen et al. on Oct. 4, 1994 is based on a hand-held electronic device using positive audio tones in conjunction with negative ones, to encourage good behaviors while discouraging bad behaviors.

A problem with the above-mentioned training devices is that the trainer must be present to activate the devices, since performance of the behavior needs to be answered immediately in order for the training to be effective. Such devices do not address situations where the animal is left unattended.

The main behavior problems generally encountered with dogs are house soiling, excessive barking, house destruction and separation anxiety. Many dogs experience separation anxiety when left unattended or out of eyesight. Dogs affected with separation anxiety become extremely anxious and exhibit behaviors including chewing, barking, salivating, urinating and defecating at inappropriate locations, vomiting and escaping. Toys are generally provided to distract the distressed animal when left unattended. More particularly, toys which may be filled with food may be used to distract the animal over a longer period of time. See for example U.S. Pat. No. 5,343,828 issued to Houghton et al. on Sep. 6, 1994. However, once they are consumed, the animal is left to itself again. This only delays the exhibition of anxiety-related behaviors without eliminating same. At present, treatment of separation anxiety is limited to confining the animal in a crate, and house soiling and excessive barking are treated with invasive and non-reversible surgeries such as castration and ablation of the vocal cords.

Species such as horses also exhibit obsessive behaviors. A "cribbing" horse repetitively grabs an object such as a fence with its teeth, arches its neck and pulls the fence backward while swallowing air and grunting. Cribbing is an inappropriate chewing behavior which is not only detrimental to the horse's health, causing damage to teeth and colic, but also destroys fences, stalls and the like. At present, cribbing is treated with invasive methods including the surgical removal of muscles and the injection of drugs.

U.S. Pat. No. 3,603,290 issued on Sep. 7, 1971 to O'Rork describes a pet-operated toilet having a reward dispenser activated by the pet and connected by a circuit to a liquid sensor and a solid sensor, and which issues a reward when paw-activated by the pet upon sensing that the pet has relieved itself in the proper area. A problem with the above-mentioned toilet and dispenser is that considerable pretraining is necessary for the animal to learn how to work the toilet.

It would therefore be highly desirable to provide an automatic training device and method that would reward the animal for exhibiting a desired behavior in the caretaker's absence and would reduce or eliminate the exhibition of undesired behaviors by the animal without punishment thereof, especially in the caretaker's absence.

It would also be highly desirable to provide an automatic training device and method which would not require prior training or preparation of the trainer or trainee.

SUMMARY OF THE INVENTION

One aim of the present invention is to provide an automatic training device and method that in the owner's absence, rewards the animal for a desired behavior and reduces or eliminates the exhibition of an undesired behavior by the animal without punishment thereof.

Another aim of the present invention is to provide an automatic training device an method which modifies the animal's behavior without education, training or preparation of the trainer and/or animal or trainee.

In accordance with the present invention, there is provided a non-punitive, positive reinforcement-based, automatically rewarding training device for training an animal or a patient in reducing exhibition of an undesired behavior in a caretaker's absence. The training device comprises a storage compartment for storing rewarding elements, a dispenser connected to the storage compartment for dispensing a rewarding element therefrom, and a behavior detector connected to the dispenser, for detecting a desired behavior, whereby detection of the desired behavior activates the dispenser, thereby automatically rewarding the animal or patient and reducing exhibition of the undesired behavior.

Contrary to punishment, which involves giving negative or aversive stimulation to the animal after an undesired behavior is performed by the animal, positive reinforcement involves rewarding the animal after the performance of a desired behavior. For example, in the case of an animal exhibiting the undesired behavior of chewing inappropriate objects, a chewtoy equipped with a pressure-sensor may be provided to the animal as an alternative target to detect the appropriate chewing behavior and activate delivery of the rewarding element, to reward the animal for exhibiting the desired behavior of chewing the alternative target. The animal associates the dispensing of the rewarding element with the desired alternative behavior and reduces frequency of the undesired behavior.

In accordance with the present invention, there is also provided a non-punitive, positive reinforcement-based automatically rewarding training device for training an animal or a patient in reducing exhibition of an undesired behavior in a caretaker's absence. The device comprises a storage compartment for storing rewarding elements, a dispenser connected to the storage compartment for dispensing a rewarding element therefrom at an interval of time, and a time-setting means connected to the dispenser, for setting the interval of time, the device automatically rewarding the animal or patient at the interval of time, thereby organizing attention to the device by the animal or patient and reducing exhibition of the undesired behavior.

Any sensory stimulus which is pleasant or appealing to the animal or patient may be used, such as food, toy, scent, image, sound, tactile items and combinations thereof. Examples include, without limitation, food and other edible material dispensed in the form of pellets, toys of the chewable type (chewtoys) made with rubber, plastic, rawhide and the like, puzzle toys and toys which may be filled with food, scents dispensed in the form of a spray, a breeze using a tunnel fan, vibrations using a vibrator and/or rocker pad, visual items and recordings. Other examples include ultrasonic sounds and sounds which are audible by humans.

The dispenser may comprise a mechanical or electronic dispensing component, for dispensing the rewarding element. The electronic dispensing component may be used when the selected rewarding element is a sound and/or an image item.

The storage compartment and the dispenser are adapted to the selected rewarding element. Food items may be contained in a housing. Scents in suspension may be contained in a canister and dispensed with a solenoid releasing mechanism in the form of a spray and/or a fan control. Images may be displayed with arrays of incandescent and/or neon bulbs in a pattern, and/or with light emitting diodes (LEDs) and liquid crystal displays (LCDs).

The frequency, intensity or brightness of the rewarding element may be adjusted.

The training device may be controlled by a computer. The computer comprises programmable printed circuit boards (PCBs) with a central processing unit (CPU). The CPU relates the activation of the behavior detector with the dispensing of the rewarding elements through the dispenser. The computer contains memory means for storage of data concerning rewarding elements such as images and the like. In the case of an image composed of patterns of lights, the CPU may control the patterns. The CPU may also control pixels in arrays in the case of images displayed on a LCD, e.g. position, brightness and/or color thereof.

The interval of time between delivery of successive rewarding elements may be controlled electronically or set manually. The interval of time at which the rewarding element is dispensed may be set taking into consideration the consumption time of the selected rewarding element. The delivery of rewarding elements may also be provided according to a schedule of variable intervals of time, which may take into consideration the consumption of the previously dispensed rewarding element.

A "response marker (RM) signal" is intended to mean a signal marking a targeted undesired behavior, to let the animal know that the device perceives the targeted behavior. The RM signal does riot coincide with non-reward under conditions of fixed interval of rewarding. However, the RM signal coincides with non-reward when the interval is changed or maximized in reaction to the detection of the targeted behavior. At that moment, however, non-reward is also signaled by a change in a "reward anticipation marker (RAM) signal", to inform the animal or patient that time until reward is being reset, or to sustain attention of the animal or patient. Rewarding elements and reward anticipation signals may be dispensed in response to detection of desired behaviors and non-reward signals may be dispensed in response to detection of undesired behaviors.

A behavior detector may be connected to the dispenser, for detecting a desired and/or an undesired behavior in the interval of time, and the dispenser may be activated upon detection of the desired behavior and/or upon an absence of detection of the undesired behavior in the interval of time. The dispensing of the rewarding element may also be effected in response to a reduced exhibition of the undesired behavior in the interval of time. Upon detecting retrieval of the rewarding element or resting of the animal or patient, the interval of time at which delivery of rewarding elements occurs may be modified.

Examples of behavior detectors include sensor components such as pressure, sound and motion sensors, capacitance switches, and microphones. For example, chewtoys may be equipped with pressure and/or tension sensors to monitor and detect an appropriate chewing behavior and reward same. A pressure-sensitive pad may detect a position of the animal thereon, which may correspond to a desired behavior such as resting, or absence of pacing, door scratching and the like spatially fixated undesired behaviors at other locations. The absence of detection may correspond to exhibition of a desired behavior by the animal, such as retrieving the rewarding element, or to that of an undesired behavior, such as scratching at an inappropriate location such as the front door of the house. The detection may further provide information for program modulation, such as specifying an interval of time between dispensing the rewarding element and retrieval of same by the animal. A sound or a capacitance sensor may also The placed at the scratching location to detect the undesired scratching behavior. The pressure or capacitance switches may provide multiple sensor input, which may allow a more complex programming of RM signals, RAM signals and reward delivery. A pressure-sensitive pad in a place mat disposed where the animal rests may detect the resting of the animal and upon detection, the reward delivery and RAM signals may be stopped until the animal moves to another location.

The behavior detector may consist of a microphone, which may be contained in the housing. The microphone may also be mounted to a collar wearable by the animal, which may hold a transmitter that communicates with the CPU, and a speaker. The collar may then provide input and detect a behavior via the microphone and output such as RM and RAM signals via the speaker to the animal. The collar may signal to the animal via an auditory signal such as a RAM signal that a rewarding element is being dispensed at a remote location. A remote control mechanism may also be connected to the collar, for manually activating the dispenser and allowing the caretaker to control the reward delivery at a distance. The dispenser may also be mounted to the collar and the selected rewarding element may consist of a scent. Such a training device may provide an effective boundary control without having resort to punitive treatment.

To reduce spatially fixated behaviors such as door scratching, a sound or capacitance sensor may be placed at the scratching location to detect the undesired behavior and register the occurrence thereof. With respect to the scratching behavior of a cat, a pressure-sensitive pad may be disposed at an appropriate location such as on a scratching post, to detect and reward the appropriate scratching behavior.

A signal generator may be connected to the time-setting means, for dispensing at least one of a RM signal and a change in RAM signal upon detecting the undesired behavior, and resetting the time-setting means. RAM signals may also be generated during the interval of time to sustain attention of the animal or patient. A variation in amplitude, frequency and/or duration of the RAM signal may be correlated with time remaining before reward delivery occurs. The animal associates the RM and changes in RAM frequency with non-delivery of the rewarding element and with the exhibition of the undesired behavior, and reduces the exhibition of the undesired behavior in order to obtain the rewarding element. Examples of RM and RAM signals include neutral tones which are audible by the animal or patient, and visual stimuli. The tones may be provided through one or more speakers. The tones and/or visual stimuli may be generated by the CPU and associated digital-to-analogue converters, or may be dispensed from pre-recorded digital sound patterns on memory chips. The sound frequency of the tones may also be in the audible and the ultrasonic range of human hearing. The training device may be equipped with a visual display for the caretaker's convenience. For example, a strip of flashing green and red lights may be used. The red lights may flash upon progressive change in RAM signal frequency and upon dispensing of RM signals while the green lights may flash upon dispensing of rewarding elements.

A refill means may be connected to the housing, for holding a refill of rewarding elements and refilling the housing with the refill of rewarding elements.

The housing may be connected to a generally vertically extending surface defining an enclosure for the animal, the dispenser may deliver the rewarding element in the enclosure, and the behavior detector may be disposed in the enclosure.

An entertainment board comprising switches may be connected to the dispenser and disposed in the enclosure, to stimulate the animal. More particularly, a pressure board with motion sensors, pressure pads and capacitance switches may supply entertainment signals. For example, the animal may press its nose on a capacitance switch, which may be adapted to supply odors or sounds items.

The automatic training device of the present invention may reduce frequency of any undesired behavior that is detectable and that can be detected and processed as an electronic signal. The frequency of one or more obsessive or undesired behaviors incompatible with our social code such as barking, pacing, scratching, whining, stereotyping (e.g. repetitive non-functional behavior) and the like may be reduced. Because the animal or patient is likely to be settled down calmly, the training device may also reduce the level of stress and, consequently, reduce inappropriate chewing, self-mutilation, eliminating and the like, and cause a reduction in physiological signs of stress and anxiety such as elevated heart rate, respiration rate and blood pressure. The training device may also settle the animal or patient in a calm emotional state, maintain a healthy diet and provide stimulation such that problematic, undesired behaviors are reduced or eliminated.

Any domestic or wild animal capable of learning to associate a behavior with a rewarding element may be trained with the training device and method of the present invention, including without limitation cats, horses, zoo animals, laboratory animals and pets in general, and more particularly dogs. The training device may also be used to reduce cribbing in species such as horses. In the case where the training device of the present invention is used for training a horse to reduce cribbing, a chewtoy comprising a motion or tension detector in the tether thereof may detect the horse chewing on the appropriate object, and may activate delivery of the rewarding element. The desired behavior is therefore positively reinforced. The horse may advantageously be set at liberty in a pasture, since it may easily be recaptured when claiming its rewarding element, and it may further easily be trained to come when called. The horse may then be rewarded by dispensing a rewarding element such as alfalfa cubes. Cribbing is a symptom of confining a range animal to a small stall, and most horses are confined to small stalls for convenience or because their owners have not trained them to come when called.

Alternatively, patients such as mentally disabled people affected with reduced socio-emotional or cognitive abilities such as in the case of autism may be trained and entertained with the training device and method of the present invention. Autistic children with severely reduced cognitive capacity and other mentally challenged children may obtain attention and behavioral support from experience with certain configurations of this device. For example, the object-based rythmicities of autistic children may be reduced in programmed schedules that use motion sensitive mini-transmitters embedded in the focal objects. Reward may be either low caloric cereal, such as Trix™ or Cheerios™, or controlled segments of video display on a household TV set. The progressive establishment of conditioned stimuli (e.g. stimuli marking a change in RAM and reward frequency or onset and RM signals may later be used by parents or custodians for attentional support in other direct teaching situations. Desired behaviors may be enacted while undesired behaviors may be avoided.

The training device of the present invention may be used in obedience training and to modify behavior and/or temperament. Several undesired behaviors may be alleviated by stimulating the animal at an interval of time and/or in response to a desired behavior by the animal, more particularly in situations where the caretaker is not present. However, the training device of the present invention may also be used when the caretaker is present.

In accordance with the present invention, there is provided a non-punitive, positive reinforcement-based, automatically rewarding training device for reducing an undesired behavior and promoting a desired behavior in an animal or a patient. The training device comprises a storage compartment having a dispenser periodically dispensing reward elements therefrom, and a signal generator producing a RAM signal detectable by the animal or patient.

The signal produced by the signal generator may vary in amplitude and/or frequency and/or time between signals over time.

The training device may further comprise a behavior detector capable of detecting an undesired behavior, and an activator disposed between the storage compartment dispenser and the behavior detector and operative to cause the storage compartment dispenser to dispense a reward element upon lack of detection of the undesired behavior within a set period of time.

The training device may further comprise a behavior detector capable of detecting a desired behavior, and an activator disposed between the storage compartment dispenser and the behavior detector and operative to cause the storage compartment dispenser to dispense a reward element upon detection of the desired behavior.

The training device may further comprise a second signal generator producing a RM signal, i.e. a stimulus contingent on the undesired response detectable by the animal or patient.

In accordance with the present invention, there is provided a non-punitive, positive reinforcement-based method for automatically training an animal or a patient to reduce exhibition of an undesired behavior in a caretaker's absence. The method comprises automatically dispensing a rewarding element to the animal or patient at an interval of time, to automatically reward the animal or patient, thereby organizing attention to the training device by the animal or patient and reducing exhibition of the undesired behavior.

The method may further comprise monitoring or detecting a desired and/or an undesired behavior in the interval of time, and the dispensing of the rewarding element may be effected upon detection of the desired behavior and/or upon a reduction or an absence of detection of the undesired behavior in the interval of time.

In accordance with the present invention, there is further provided a non-punitive, positive reinforcement-based method for automatically training an animal or a patient to reduce exhibition of an undesired behavior in a caretaker's absence. The method comprises selecting a rewarding element from the group consisting of food, toy, scent, image, sound items and combinations thereof, storing the rewarding elements in a storage compartment, connecting the storage compartment to a dispenser adapted to deliver a rewarding element therefrom at an interval of time, connecting a time-setting means to the dispenser and setting the time-setting means to the interval of time, and connecting a behavior detector to the dispenser, for dispensing the rewarding element upon detection of the desired behavior and/or upon a reduction or an absence of detection of the undesired behavior in the interval of time.

BRIEF DESCRIPTION OF THE DRAWINGS

Having thus generally described the nature of the invention, reference will now be made to the accompanying drawings, showing by way of illustration, preferred embodiments thereof, in which like numerals refer to like components, and in which:

FIG. 1 schematically illustrates components of a first embodiment of a training device according to the present invention, shown in a front view (1A), a top view (1B) and a side view (1C);

FIG. 7 is a diagrammatic view of a fifth embodiment of a training device in accordance with the present invention.

DETAILED DESCRIPTION OF THE INVENTION

Figure 2:
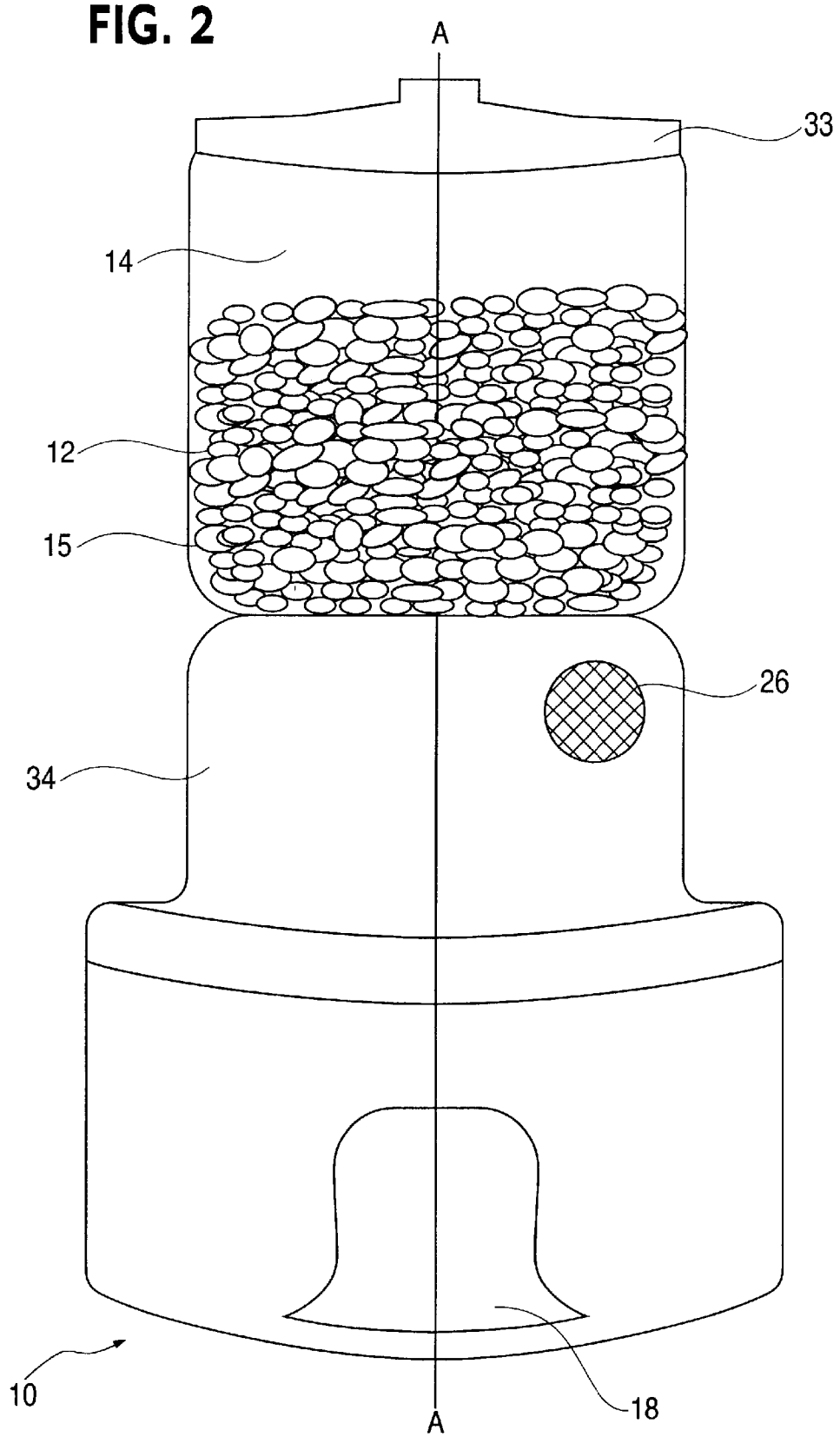
FIG. 2 illustrates in a front view a second embodiment of a training device in accordance with the present invention.

The present invention provides a device and a method based on rewarding good behaviors, rather than punishing bad behaviors. The animal's general behavior is monitored with behavior detectors, and desired and/or undesired behaviors are targeted. Rewards and reward anticipation signals are dispensed in response to desired behaviors and response marking signals in response to undesired behaviors.

In the case of an animal displaying an escaping behavior, rather than trying to stop the animal from escaping, the training device of the present invention teaches the animal to stay in proximity of the dispenser by setting a short interval of time at which rewarding elements are dispensed, such as one minute, and by providing a tethered chewtoy with a motion or a tension detector mounted thereto, or a pressure-sensitive mat. The animal is conditioned to anticipate the next dispensing of rewarding element. The animal is provided rewards unless the undesired behavior is detected. Upon detection of the undesired behavior, a RM signal such as a neutral tone is dispensed by a signal generator, the interval of time is reset to a programmed maximum (reset to zero) and the occurrence of RAM signals is reset to indicate that fact. The animal associates the RM signal with the non-delivery of a reward and with the performance of the undesired behavior, and reduces the exhibition of the undesired behavior in order to obtain the reward.

There is provided a positive reinforcement-based training device and a method without punitive treatment, to reduce an undesired behavior exhibition or maintain a reduced frequency thereof, and to increase a desired behavior frequency. The animal or patient is more motivated to learn and, overall, improves its, his or her performance.

FIGS. 1A–1C show diagrams of a first embodiment of training device identified with reference numeral 10, for the automatic training of a dog to reduce exhibition of an undesired behavior, such as barking or the like.

Referring to FIGS. 1A–1C, the automatic training device 10 is shown with a housing 12 defining a reservoir 14 for holding food pellets, to reward the dog. Not shown is a lid, which removably closes the reservoir 14 at the top side thereof, for filling the reservoir 14 with a supply of food pellets. The bottom side of the reservoir 14 defines a bottom opening 16, which communicates with a channel 18 defined by the housing 12, for dispensing the food pellets therethrough from the reservoir 14. A dispenser 20 is disposed to removably close the bottom opening 16 of the reservoir 14, to retain the food pellets therein. The dispenser 20 will be described in more details hereinafter. A recipient such as a food bowl 22 is connected to the housing 12, to receive the food pellets dispensed from the reservoir 14 through the channel 18.

An electronic control system comprising a printed circuit board (PCB) 24 is contained in the housing 12. The PCB 24 is connected by a power connection with the dispenser 20. The PCB 24 has an electronic control component comprising an integrated circuit containing a central processing chip, analog-to-digital and digital-to-analog chips, memory chips, and ROM chips holding a program controlling the functions of the automatic training device 10. The PCB 24 includes a central processing unit (CPU), which is associated with programmed erasable programmable read-only memories (EPROMs) disposed on the PCB 24, to control activation of the dispenser 20. The PCB 24 is programmed to control and activate the dispenser 20 when the automatic training device 10 detects the absence of an undesired behavior. For this, a behavior detector such as a microphone 26 is connected to the PCB 24, for detecting exhibition of the undesired behavior by the dog. The PCB 24 includes a program for dispensing the rewarding elements at an interval of time. The PCB 24 contains a time-setting mechanism (not shown) and is programmed to set and control an interval of time for activating the dispenser 20. The PCB 24 is also programmed to control emission of a progressive sequence of RM and RAM auditory signals by a signal generator, through an audio signal-emitting device such as a speaker 28 connected to the PCB 24.

A visual stimuli display 30 is also connected to the PCB 24. The visual stimuli display 30 consists of a strip of three light bulbs 31. The PCB 24 controls flashing of the light bulbs in a first pattern in conjuction with the speaker of emitting RAM signals, and in a second pattern upon activation of the dispenser 20.

A battery 32 supplies power to the training device 10.

In operation, the training device 10 begins to emit the progressive sequence of RAM signals through the speaker 28 that changes in frequency and time between signals over the course of an interval of time set at 2 minutes. If no barking by the dog is detected through the microphone 26 during the 2-minute interval of time, the program of the PCB 28 concludes the set interval of time by emitting a RAM tone which attracts the dog's attention to the training device 10, and by activating the dispenser 20, thereby dispensing food pellets from the reservoir 14 which slide down into the channel and into the food bowl 48, for access by the dog. If the dog barks at any moment during the set interval of time, the training device 10 detects it through the microphone 24, and the signal detected is sent to the PCB 24, which resets the interval of time to the beginning thereof. A record of the number of barks detected and deliveries of pellets may also be retained in the PCB 24, for later access by the caretaker.

This training device was used with dogs and the timing of signals and the behavior-reward contingency program embedded in the electronic control system thereof had marked effects on reducing outward signs of stress and enactment of undesired behaviors. More specifically, in testing with ten dogs, all the dogs rapidly developed heightened attention to the training device and a commensurate reduction in anxiety-related behaviors (e.g. scratching, pacing, barking and the like). After a few days exposure to the training device, one "lonely barker" barked an average of once every three seconds for half an hour while isolated without the training device. However, when accompanied by the training device, the dog did not bark at all during the next hour.

Figure 3:
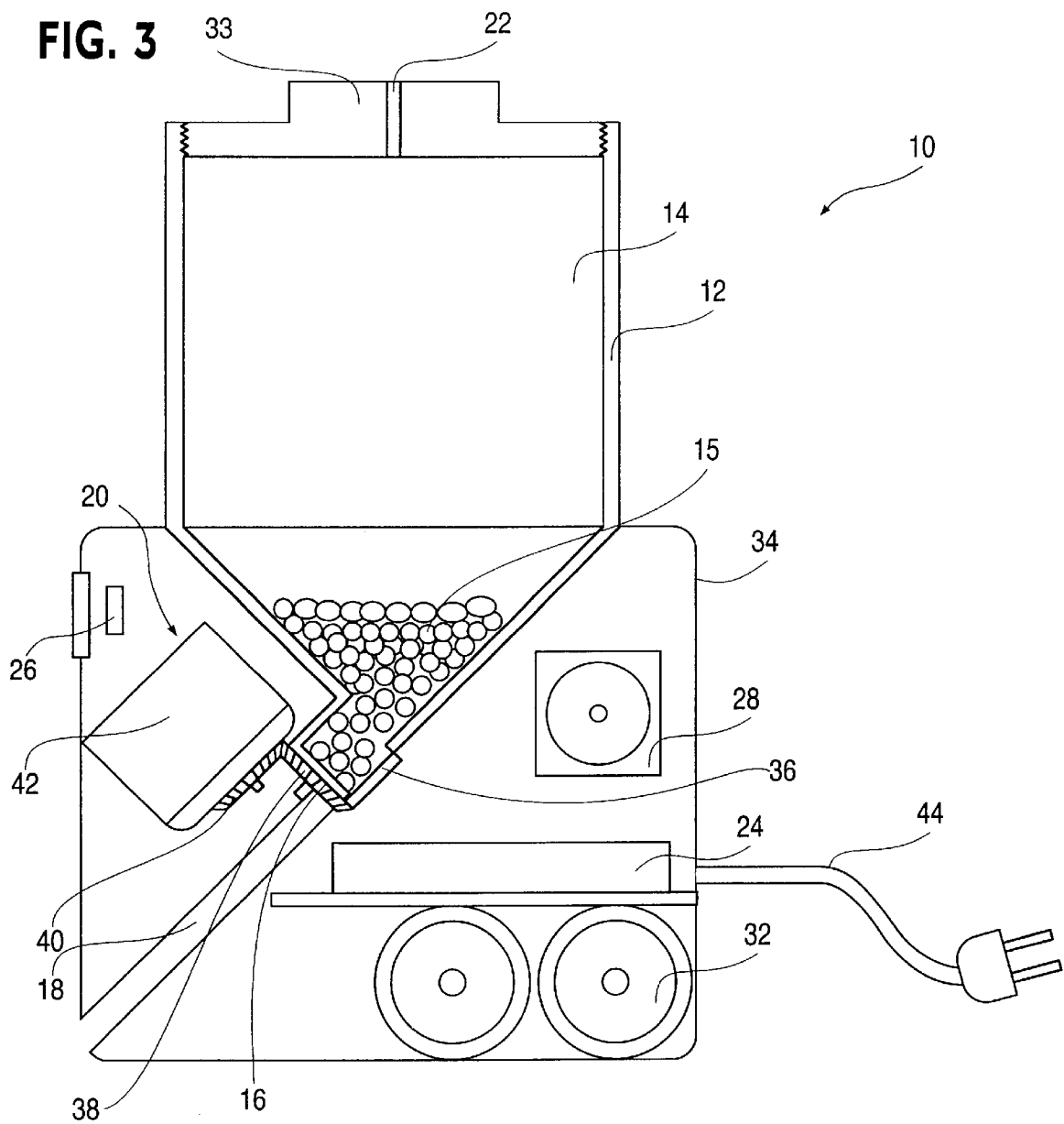
FIG. 3 illustrates a cross-section of the training device shown in FIG. 2, taken along line A—A thereof.

FIGS. 2–3 present another embodiment of training device in accordance with the present invention. Referring to FIG. 2, the housing 12 of the automatic training device 10 defines in an upper part thereof the reservoir 14, which is filled with rewarding elements, in this case pellets of food 15. Other items such as toys and more particularly toys filled with food may be contained in the reservoir 14. The top opening of the reservoir 14 is closed by a removable lid 33, to allow access to the reservoir 14. The housing 12 includes a base 34 in the lower part thereof, which supports the reservoir 14 and defines the channel 18 through which the pellets of food are dispensed. The base 34 also encloses the microphone 26 and other components (not shown).

FIG. 3 shows a side view taken along line A—A of FIG. 2. The housing 12 defines the reservoir 14, which holds the pellets of food 15, for rewarding the animal. The top side of the reservoir 14 is removably closed with the lid 33, which defines a top opening 35 and is adapted to connect with a means for refilling the reservoir 14 with pellets of foods (not shown).

The bottom side of the reservoir 14 defines the bottom opening 16, which communicates with the channel 18 defined by the base 34.

The dispenser 20 comprises a cup 36 with a first gear 38 removably disposed to close the bottom opening 16 of the reservoir 14. The first gear 38 is connected with a second gear 40 mounted to a motor 42. The motor 42 is connected to the PCB 24. Power is supplied to the motor 42 via batteries 32 and/or plug. In operation, the motor 42 activates rotation of the second gear 40, which activates rotation of the first gear 38 and displaces the cup 36 to leave the bottom opening 16 open. The pellets 15 then slide down from the reservoir 14 into the channel 18.

The microphone 26 is connected to the PCB 24, for detecting exhibition of an undesired behavior by the animal, such as barking, whining or the like.

The speaker 28 is connected to the PCB 24, for emitting a RM signal therethrough upon detection through the microphone 26 of the undesired behavior.

Figure 4:
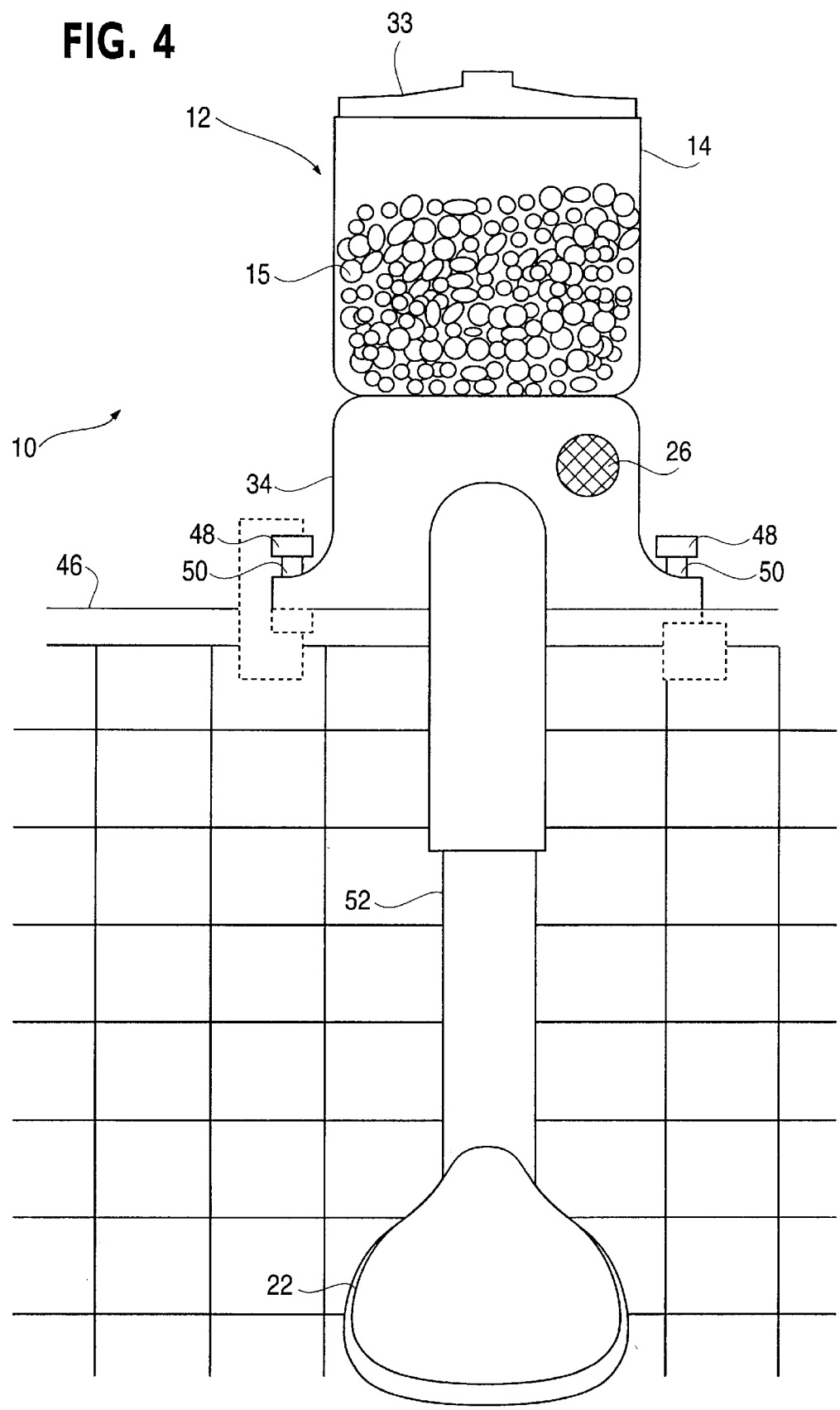
FIG. 4 illustrates in a front view the training device of FIG. 2, shown connected to a recipient.

FIG. 4 shows the embodiment of training device 10 shown in FIG. 2 secured to a vertically extending surface such as a park 46 with screws 48 into holes 50 defined by the base 34 and which attach the training device to the park 46. The park 46 defines an enclosure in which the dog may be kept. A sleeve 52 connects the food bowl 22 to the housing 12, for dispensing the pellets of food 15 into the enclosure, for access by the dog.

Figure 5:
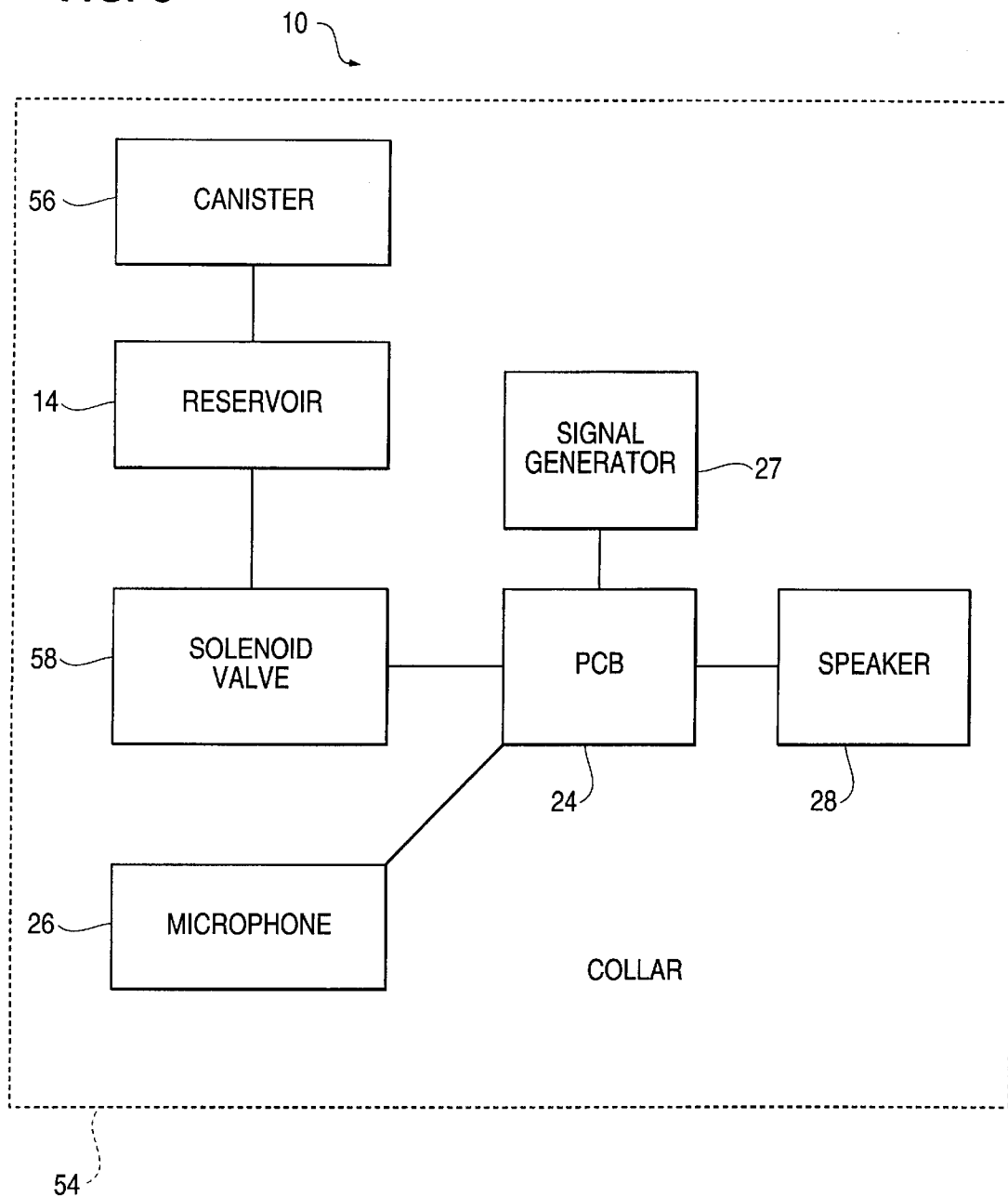
FIG. 5 is a diagrammatic view of a third embodiment of a training device in accordance with the present invention.

FIG. 5 shows in a diagrammatic view another embodiment of a training device 10 in accordance with the present invention. There is provided a collar 54 which is adapted to be worn by the animal. The collar 54 defines the reservoir 14, which is adapted to contain an aerosol containing a scent appealing to the animal to be released in the form of a spray. A filling valve (not shown) is connected with the reservoir 14, for receiving a canister 56 containing a supply of the aerosol, to fill the reservoir 14 with the aerosol. A solenoid valve 58 is also connected to the reservoir 14, for releasing a dose of the aerosol in the form of a spray from the reservoir 14. The solenoid valve 58 is connected to the PCB 24, which controls the activation of the solenoid valve 58. The microphone 26 is connected to the PCB 28, for detecting the undesired behavior. The signal generator 27 is connected to the PCB 24, for generating RM signals, and the speaker 28 is connected to the PCB 28, for emitting RM signals when an undesired behavior such as barking and the like is detected. The PCB 24 has programmed an interval of time.

In operation, upon detection of an inappropriate barking through the microphone 26, the PCB 24 sends a RM signal through the speaker 28 for the animal to hear, the solenoid valve 58 remains inactivated and closed such that no reward is provided to the animal, and the interval of time is reset to zero. If the animal does not bark during the full interval of time, the PCB 24 activates the solenoid valve 58, which opens to release from the reservoir 14 a dose of aerosol containing the scent which is pleasing to the animal. The device also comprises a manual override for a direct remote control of rewards, RM and RAM signals dispensing, for optional teaching when the caretaker is present.

Figure 6:
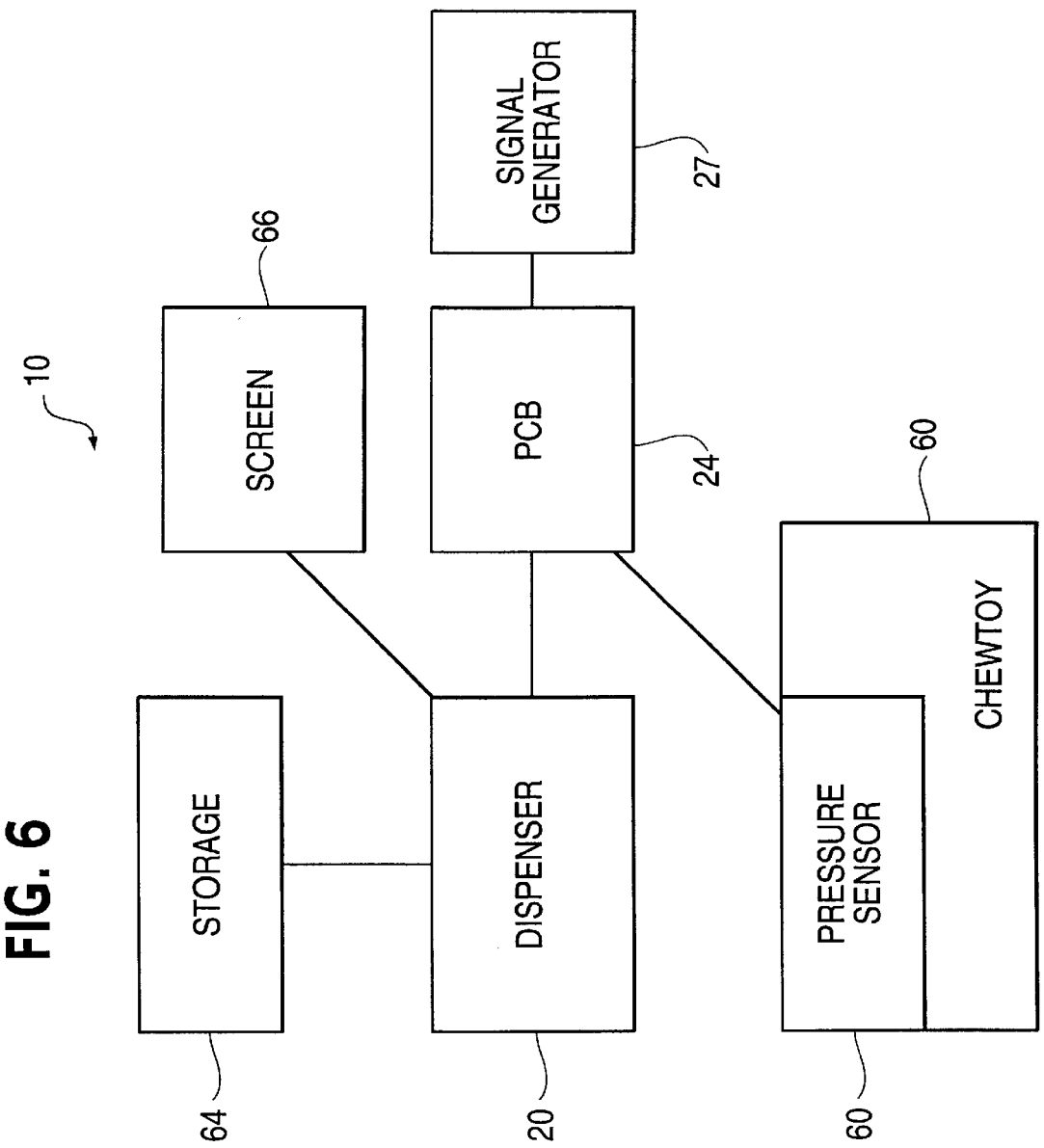
FIG. 6 is a diagrammatic view of a fourth embodiment of a training device in accordance with the present invention.

FIG. 6 illustrates in a diagrammatic view another embodiment of the automatic training device 10 of the present invention, for training an animal to reduce an undesired behavior such as chewing inappropriate objects. A pressure-sensor 60 connected to the dispenser 20 is inserted in a chewtoy 62. In operation, detection of the appropriate chewing behavior by the pressure-sensor 60 when the animal chews on the chewtoy 62 activates the dispenser 20, and a reward such as an image stored in the storage component 64 of the housing 12 is displayed on a screen 66.

FIG. 7 shows a diagram of yet another embodiment of the training device 10 of the present invention, for training an animal to reduce scratching at inappropriate locations. The training device 10 comprises a microphone 24 connected to the PCB 24, for detecting a sound caused by the undesired scratching behavior. The signal generator 27 is connected to the PCB 24, for generating RM and RAM signals, and the speaker 28 is connected to the PCB 28, for emitting a RM signal when the inappropriate, undesired scratching behavior is detected through the microphone 24. A screen 66 connected to the PCB 24 displays images thereon to reward the animal for not exhibiting the scratching behavior in an interval of time. However, if the animal exhibits the undesired behavior, the interval of time of the PCB 24 is reset to zero and no image is displayed on the screen 66.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

What is claimed is:

1. A non-punitive, positive reinforcement-based, automatically rewarding training device for training an animal or a patient in reducing exhibition of an undesired behavior in a caretaker's absence, said device comprising:
   a) a storage compartment for storing rewarding elements;
   b) a dispenser connected to said storage compartment for dispensing a rewarding element therefrom; and
   c) a behavior detector connected to said dispenser, for detecting a desired behavior;
whereby detection of said desired behavior activates said dispenser, thereby automatically rewarding said animal or patient and reducing exhibition of said undesired behavior.

2. A non-punitive, positive reinforcement-based, automatically rewarding training device for training an animal or a patient in reducing exhibition of an undesired behavior in a caretaker's absence, said device comprising:
   a) a storage compartment for storing rewarding elements;
   b) a dispenser connected to said storage compartment for dispensing a rewarding element therefrom at an interval of time; and
   c) a time-setting means connected to said dispenser, for setting said interval of time;
   said device automatically rewarding said animal or patient at said interval of time, thereby organizing attention to said device by said animal or patient and reducing exhibition of said undesired behavior, wherein a behavior detector is connected to said dispenser, for detecting at least one of a desired behavior and an undesired behavior in said interval of time, and wherein said dispenser is activated upon detection of said desired behavior or upon a reduction or an absence of detection of said undesired behavior in said interval of time.

3. A training device according to claim 2, wherein a signal generator is connected to said time-setting means, for generating at least one of a response marker (RM) signal and a change in a reward anticipation marker (RAM) signal upon detecting said undesired behavior, and for resetting said time-setting means.

4. A training device according to claim 3, wherein at least one of said RM signal and RAM signal is audible by said animal or patient.

5. A training device according to claim 4, wherein said rewarding element is selected from the group consisting of food, toy, scent, image, sound, tactile items and combinations thereof.

6. A training device according to claim 5, wherein said undesired behavior is one or more of barking, pacing, self-mutilating, chewing, whining, scratching, cribbing, stereotyping and inappropriate urinating and defecating.

7. A training device according to claim 6, wherein said storage compartment consists of a housing and wherein a refill means is connected to said housing, for holding a refill of said rewarding elements and refilling said housing with said refill of said rewarding elements.

8. A training device according to claim 7, wherein said housing is connected to a generally vertically extending surface defining an enclosure for said animal or patient, wherein said dispenser delivers said rewarding element in said enclosure and wherein said behavior detector is disposed in said enclosure.

9. A training device according to claim 6, wherein said behavior detector is mounted to a collar wearable by said animal, and wherein a remote control mechanism is connected to said collar, for signaling to said animal of said dispensing of said rewarding element at a distance.

10. A training device according to claim 9, wherein said dispenser is mounted to said collar.

11. A non-punitive, positive reinforcement-based method for automatically training an animal or a patient to reduce exhibition of an undesired behavior in a caretaker's absence, the method comprising automatically dispensing a rewarding element to said animal or patient at an interval of time, to automatically reward said animal or patient, thereby organizing attention to said device by said animal or patient and reducing exhibition of said undesired behavior.

12. A method according to claim 11, further comprising detecting at least one of a desired and an undesired behavior in said interval of time, and wherein said dispensing of said rewarding element is effected upon detection of said desired behavior and/or upon an absence of detection of said undesired behavior in said interval of time.

13. A method according to claim 12, wherein said rewarding element is selected from the group consisting of food, toy, scent, image, sound items and combinations thereof.

14. A method according to claim 13, wherein upon detecting said undesired behavior in said interval of time, at least one of a response marker (RM) signal and a change in reward anticipation marker (RAM) signal is dispensed to said animal, and said interval of time is reset.

15. A method according to claim 14, wherein at least one of said RM signal and RAM signal is audible to said animal or patient.

16. A method according to claim 15, wherein said undesired behavior is one or more of barking, scratching, whining, chewing, pacing, self-mutilating, cribbing, stereotyping and inappropriate urinating and defecating.

17. A method according to claim 16, wherein said animal is selected from a group consisting of human, canine, feline and equine species.

18. A non-punitive, reinforcement-based method for automatically training an animal or a patient to reduce exhibition of an undesired behavior in a caretaker's absence, the method comprising:
a) selecting a rewarding element from the group consisting of food, toy, scent, image, sound items and combinations thereof;
b) storing said rewarding elements in a storage compartment;
c) connecting said storage compartment to a dispenser adapted to deliver a rewarding element from said storage compartment at an interval of time;
d) connecting a time-setting means to said dispenser and setting said time-setting means to the interval of time; and
e) connecting a behavior detector to said dispenser, for dispensing said rewarding element upon detection of a desired behavior or reduction or absence of detection of an undesired behavior in said interval of time.

19. A non-punitive, positive reinforcement-based, automatically rewarding training device for reducing an undesired behavior and promoting a desired behavior in an animal or patient comprising:
a) a storage compartment having a dispenser periodically dispensing reward elements therefrom; and
b) a signal generator for producing a reward anticipation marker (RAM) signal detectable by the animal or patient.

20. A training device according to claim 19, wherein the RAM signal produced by said signal generator varies in amplitude over time.

21. A training device according to claim 20, further comprising:
a) a behavior detector capable of detecting an undesired behavior; and
b) an activator disposed between said storage compartment dispenser and said behavior detector and operative to cause said storage compartment dispenser to dispense a reward element upon lack of detection of the undesired behavior within a set period of time.

22. A training device according to claim 21, further comprising:
a) a behavior detector capable of detecting a desired behavior; and
b) an activator disposed between said storage compartment dispenser and said behavior detector and operative to cause said storage compartment dispenser to dispense a reward element upon detection of the desired behavior.

23. A training device according to claim 22, further comprising a second signal generator producing a response marker (RM) signal detectable by the animal or patient.

24. A training device according to claim 21, further comprising a second signal generator for producing a response marker (RM) signal detectable by the animal or patient.

25. A training device according to claim 19, wherein the RAM signal produced by said signal generator varies in frequency over time.

26. A training device according to claim 25, further comprising:
a) a behavior detector capable of detecting an undesired behavior; and
b) an activator disposed between said storage compartment dispenser and said behavior detector and operative to cause said storage compartment dispenser to dispense a reward element upon lack of detection of the undesired behavior within a set period of time.

27. A training device according to claim 26, further comprising:
a) a behavior detector capable of detecting a desired behavior; and
b) an activator disposed between said storage compartment dispenser and said behavior detector and operative to cause said storage compartment dispenser to dispense a reward element upon detection of the desired behavior.

28. A training device according to claim 27, further comprising a second signal generator producing a response marker (RM) signal detectable by the animal or patient.

29. A training device according to claim 26, further comprising a second signal generator for producing a response marker (RM) signal detectable by the animal or patient.

30. A training device according to claim 19, wherein the RAM signal produced by said signal generator varies in amplitude and frequency over time.

31. A training device according to claim 30, further comprising:
a) a behavior detector capable of detecting an undesired behavior; and
b) an activator disposed between said storage compartment dispenser and said behavior detector and operative to cause said storage compartment dispenser to dispense a reward element upon lack of detection of the undesired behavior within a set period of time.

32. A training device according to claim 31, further comprising:
a) a behavior detector capable of detecting a desired behavior; and
b) an activator disposed between said storage compartment dispenser and said behavior detector and operative to cause said storage compartment dispenser to dispense a reward element upon detection of the desired behavior.

33. A training device according to claim 32, further comprising a second signal generator for producing a response marker (RM) signal detectable by the animal or patient.

34. A training device according to claim 31, further comprising a second signal generator for producing a response marker (RM) signal detectable by the animal or patient.

35. A training device according to claim 19, wherein the RAM signal produced by said signal generator varies in time between signals over time.

36. A training device according to claim 35, further comprising:
   a) a behavior detector capable of detecting an undesired behavior; and
   b) an activator disposed between said storage compartment dispenser and said behavior detector and operative to cause said storage compartment dispenser to dispense a reward element upon lack of detection of the undesired behavior within a set period of time.

37. A training device according to claim 36, further comprising:
   a) a behavior detector capable of detecting a desired behavior; and
   b) an activator disposed between said storage compartment dispenser and said behavior detector and operative to cause said storage compartment dispenser to dispense a reward element upon detection of the desired behavior.

38. A training device according to claim 37, further comprising a second signal generator for producing a response marker (RM) signal detectable by the animal or patient.

39. A training device according to claim 36, further comprising a second signal generator for producing a response marker (RM) signal detectable by the animal or patient.

40. A training device according to claim 19, wherein the RAM signal produced by said signal generator varies in amplitude and time between signals over time.

41. A training device according to claim 40, further comprising:
   a) a behavior detector capable of detecting an undesired behavior; and
   b) an activator disposed between said storage compartment dispenser and said behavior detector and operative to cause said storage compartment dispenser to dispense a reward element upon lack of detection of the undesired behavior within a set period of time.

42. A training device according to claim 41, further comprising:
   a) a behavior detector capable of detecting a desired behavior; and
   b) an activator disposed between said storage compartment dispenser and said behavior detector and operative to cause said storage compartment dispenser to dispense a reward element upon detection of the desired behavior.

43. A training device according to claim 42, further comprising a second signal generator for producing a response marker (RM) signal detectable by the animal or patient.

44. A training device according to claim 41, further comprising a second signal generator for producing a response marker (RM) signal detectable by the animal or patient.

45. A training device according to claim 19, wherein the RAM signal produced by said signal generator varies in frequency and time between signals over time.

46. A training device according to claim 45, further comprising:
   a) a behavior detector capable of detecting an undesired behavior; and
   b) an activator disposed between said storage compartment dispenser and said behavior detector and operative to cause said storage compartment dispenser to dispense a reward element upon lack of detection of the undesired behavior within a set period of time.

47. A training device according to claim 46, further comprising:
   a) a behavior detector capable of detecting a desired behavior; and
   b) an activator disposed between said storage compartment dispenser and said behavior detector and operative to cause said storage compartment dispenser to dispense a reward element upon detection of the desired behavior.

48. A training device according to claim 47, further comprising a second signal generator for producing a response marker (RM) signal detectable by the animal or patient.

49. A training device according to claim 46, further comprising a second signal generator for producing a response marker (RM) signal detectable by the animal or patient.

50. A training device according to claim 19, wherein the RAM signal produced by said signal generator varies in amplitude, frequency, and time between signals over time.

51. A training device according to claim 50, further comprising:
   a) a behavior detector capable of detecting an undesired behavior; and
   b) an activator disposed between said storage compartment dispenser and said behavior detector and operative to cause said storage compartment dispenser to dispense a reward element upon lack of detection of the undesired behavior within a set period of time.

52. A training device according to claim 51, further comprising:
   a) a behavior detector capable of detecting a desired behavior; and
   b) an activator disposed between said storage compartment dispenser and said behavior detector and operative to cause said storage compartment dispenser to dispense a reward element upon detection of the desired behavior.

53. A training device according to claim 52, further comprising a second signal generator for producing a response marker (RM) signal detectable by the animal or patient.

54. A training device according to claim 51, further comprising a second signal generator for producing a response marker (RM) signal detectable by the animal or patient.

55. A training device according to claim 19, further comprising:
   a) a behavior detector capable of detecting an undesired behavior; and
   b) an activator disposed between said storage compartment dispenser and said behavior detector and operative to cause said storage compartment dispenser to dispense a reward element upon lack of detection of the undesired behavior within a set period of time.

56. A training device according to claim 55, further comprising:
   a) a behavior detector capable of detecting a desired behavior; and
   b) an activator disposed between said storage compartment dispenser and said behavior detector and operative to cause said storage compartment dispenser to dispense a reward element upon detection of the desired behavior.

57. A training device according to claim 56, further comprising a second signal generator for producing a response marker (RM) signal detectable by the animal or patient.

58. A training device according to claim 55, further comprising a second signal generator for producing a response marker (RM) signal detectable by the animal or patient.

* * * * *